Aug. 12, 1941.　　P. S. EDMUNDS ET AL　　2,251,925
TOASTER
Filed June 29, 1939　　2 Sheets-Sheet 1
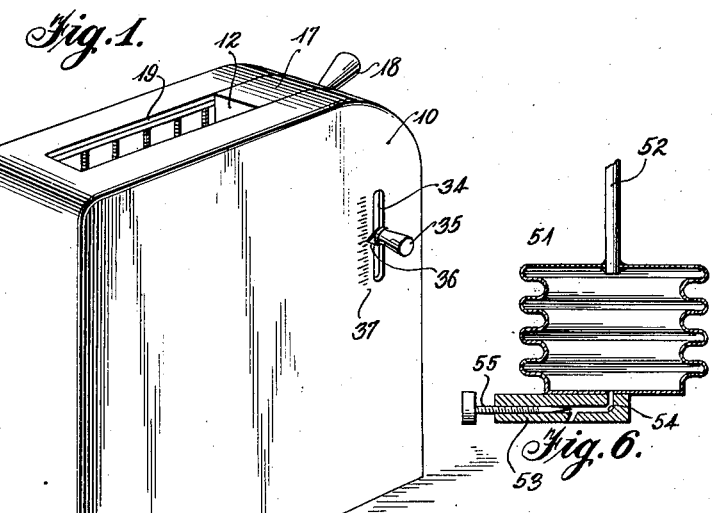
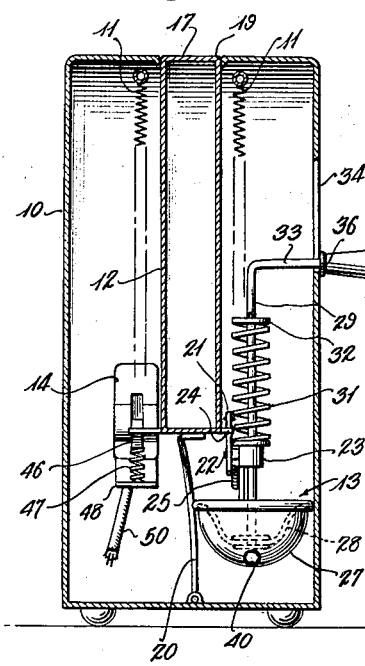
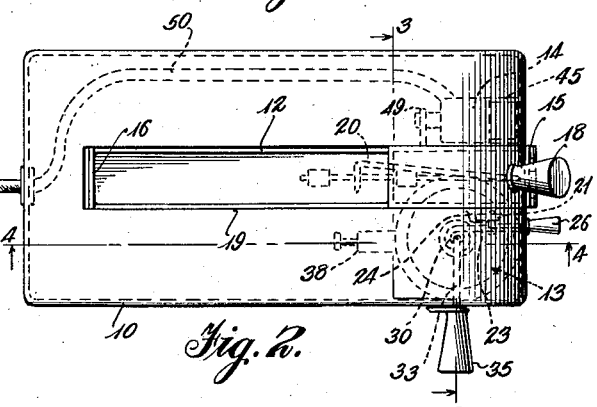
Inventors
Phillip S. Edmunds
and Ned M. Becker
By Bacon & Thomas
Attorneys Aug. 12, 1941.   P. S. EDMUNDS ET AL   2,251,925
TOASTER
Filed June 29, 1939   2 Sheets-Sheet 2

Inventors
Phillip S. Edmunds
and Ned M. Becker
By Bacon & Thomas
Attorneys

Patented Aug. 12, 1941

2,251,925

UNITED STATES PATENT OFFICE 2,251,925

TOASTER

Phillip S. Edmunds and Ned M. Becker, Chicago, Ill.

Application June 29, 1939, Serial No. 281,942

2 Claims. (Cl. 161—16)

This invention relates to toasters, and more particularly to automatic electric toasters provided with a novel timing device.

An object of the present invention is to provide a novel toaster which automatically removes material being toasted from the toasting zone after a predetermined settable time interval.

Another object of the invention is to provide an automatic toaster utilizing a vacuum element as a timing device.

Another object of the invention is to provide an automatic toaster having a movable carrier which is locked in position and released by a timing device after a predetermined interval.

Another object of the invention is to provide an automatic toaster in which a carrier for the material being toasted is locked in toasting position for a predetermined time interval and in which a manual release is also provided for the carrier.

Another object of the invention is to provide a novel timing device for toasters and the like.

Other objects and advantages of the invention will appear in the following description of a preferred embodiment thereof shown in the attached drawings, of which:

Figure 1 is a perspective view of a toaster in accordance with the present invention;

Figure 2 is a plan view of the toaster;

Figure 3 is a vertical cross section taken on the line 3—3 of Figure 2;

Figure 6 is a vertical section of a modified form of timing device; and

Figure 7 is a vertical section of a still further modified form of timing device.

Figure 4:
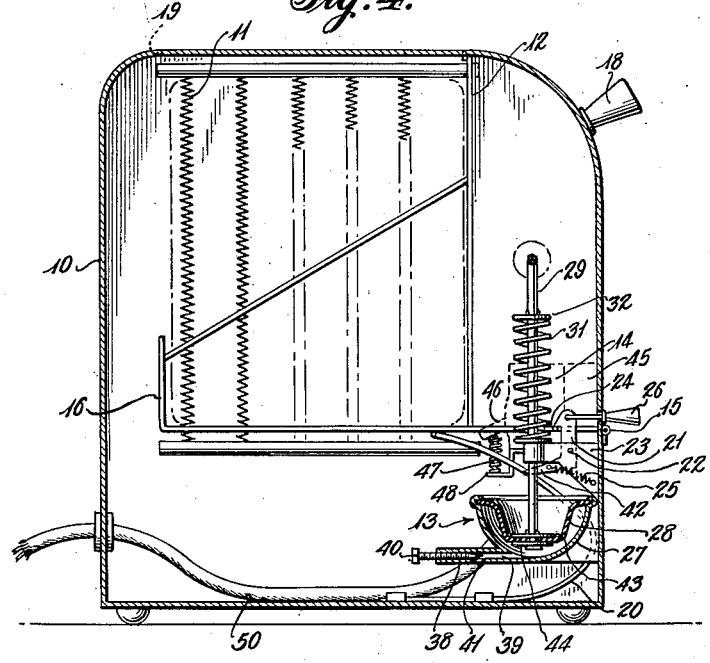
Figure 4 is a vertical cross section taken on the line 4—4 of Figure 2.

Referring more particularly to the drawings, the toaster includes a casing 10 provided with heating elements 11, a toast carrier 12, a timing device shown generally at 13, and an electric switch 14. The toast carrier 12 is shown as being pivoted at 15 and has a toast carrying portion 16 and a forward portion 17 provided with a handle 18.

The toast carrier 12 is positioned in a slot 19 in the casing 10 of the toaster and occupies the position shown in Figure 4 during toasting. The toast carrier 12 is urged toward the position shown in Figure 5 by a spring 20. A latch member 21 is pivoted at 22 to a bracket 23 carried by the casing 10 and engages a detent member 24 forming part of the toast carrier 12 to retain the toast carrier in toasting position shown in Figure 4. A spring 25 urges the latch member 15 to locking position shown in Figure 4. The latch member 21 may be manually released by pulling a handle 26 connected to the upper portion of the latch member 21 in order to rock the latch member 21 clockwise in Figure 4 so as to release the toast carrier 12.

The timing mechanism includes a cup member 27 also carried by the bracket 23, which cup member is closed by a flexible diaphragm 28 connected at its center to a vertically extending slidable member 29. The slidable member extends through an aperture 30 in the bracket 23 and is urged upwardly by a compression spring 31 surrounding the slidable member. The lower end of the spring 31 engages the bracket 23 and the upper end of the spring engages a stop member 32 secured to the slidable member 29. The slidable member 29 is bent laterally, as most clearly shown in Figure 3, and has a portion 33 extending outwardly through a slot 34 in the casing 10 and terminates in a handle 35. The handle 35 may be provided with an indicating point 36 adjacent a scale 37 on the exterior surface of the casing 10.

As shown in Figure 4, the cup member 27 is provided with an extending duct member 38 having a duct 39 communicating with the interior of the cup member. The duct member 38 also is provided with a throttling screw 40 which, as is apparent from Figure 4, can be employed to vary the opening 41 between the duct 39 and the atmosphere. Depressing the handle 35 of the slidable member 29 depresses the flexible diaphragm 28 into the position shown in Figure 4 so as to force air out of the cup member through the duct 39. The spring 31 then returns the slidable member 29 upwardly at a rate determined by the setting of the screw 40 until it reaches its upper position shown in Figure 5.

The latch member 21 is provided with a trigger portion 42 which is positioned to be engaged by a member 43 carried by the lower end of the slidable member 29 adjacent the diaphragm 28. Upward movement of the member 43 rocks the latch member 21 about its pivot 22 to release the toast carrier 12. The member 43 may comprise a clamping member for the diaphragm 28 which, in conjunction with a lower clamping member 44, secures the diaphragm 28 to the slidable member 29.

Figure 5:
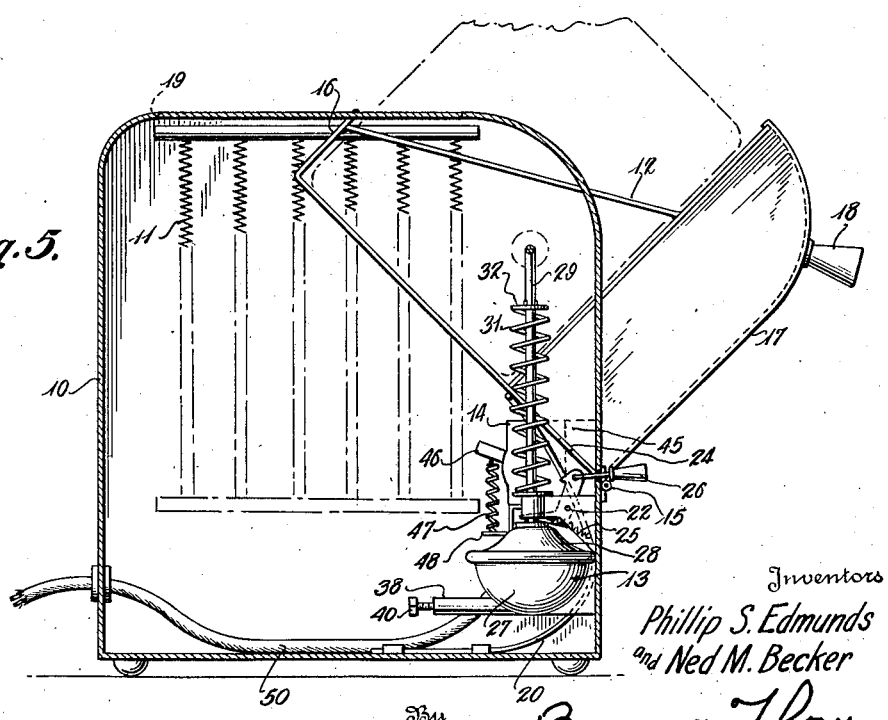
Figure 5 is a vertical cross section with the carrier in released position.

The electric switch 14 is arranged to be closed when the toast carrier is in toasting position, shown in Figure 4, and to be opened when the toast carrier is in its released position, shown in Figure 5. The switch 14 may be carried by a bracket member 45 and may be provided with an operating lever 46 urged by a compression spring 47 into the "off" position. The compression spring 47 may have its upper end engaging the lower portion of the operating lever 46 and its lower end engaging an extending portion 48 of the bracket 45. The toast carrier may be provided with a projecting portion 49, most clearly shown in Figures 2 and 3, which engages the upper surface of the operating lever 46 of the switch 14 to move the same into the "on" position when the toast carrier is moved to toasting position. The details of the electric switch are not shown, as any of the well known quick-acting switch structures now available may be employed. The switch 14 may connect and disconnect all of the toasting element 11 to the source of electric power through conductors 50 or may connect and disconnect only a portion of the heating element 11 or may connect portions of the heating element in parallel in the "on" position while leaving them in series in the "off" position. The latter two arrangements provide for maintaining the toasting element warm during non-toasting periods when the toaster is connected to the source of electric power but raises the toasting element to toasting temperature when the toast carrier is in toasting position. The precise electrical connections within the toaster are not shown, as such connections are within the skill of the art.

To operate the toaster, it is first connected to a suitable source of electric power through the conductors 50. The various elements of the toaster would be in the position shown in Figure 5, in which the toast carrier 12 is in released position, the slidable member 29 in its upper position, and the switch operating lever 46 in its "off" position. A slice of bread or other material to be toasted would then be inserted in the toast carrier 12, the handle 35 of the slidable member 29 depressed to a desired extent, as indicated by the scale 37, and the toast carrier moved against the action of the spring 20 into toasting position. Since the slidable member 29 has been depressed, the spring 25 for the latch member 23 will cause this member to latch the toast carrier in toasting position. Depression of the slidable member 29 forces air out of the cup member 27 and, upon release of the slidable member, the spring 31 advances the slidable member 29 upwardly to draw air into the cup member 27. The duct 39 connecting the cup member with the atmosphere is throttled by the adjusting screw 40 so that the slidable member 29 moves upwardly at a predetermined rate. The adjusting screw 40 is ordinarily employed to adjust the rate of movement of the slidable member 29 at the factory or during servicing of the toaster as the time of toasting is ordinarily determined by the amount of depression of the handle 35 of the slidable member 29.

Movement of the toast carrier into toasting position moves the operating lever 46 of the switch 41 into "on" position by engagement of the member 49 carried by the toast carrier 12 with the operating lever 46. This brings the heating element 11 to toasting temperature.

When the slidable member 29 reaches its uppermost position, shown in Figure 5, the member 43 engages the trigger portion 42 of the latch member 21 to release the toast carrier.

The spring 20 then moves the toast carrier from the position shown in Figure 4 to the position shown in Figure 5, to enable the toasted material to be removed from the toaster. Movement of the toast carrier also allows the switch operating spring 47 to move the operating lever of the switch from "on" to "off" position, shown in Figure 5. The toast carrier may be released at any time prior to automatic release by the timing device by pulling the handle 46 connected to the latch member 21.

It is evident that the extent of depression of the handle 35 of the slidable member 29 will predetermine the toasting time before automatic release. That is, partial depression of the handle 35 will provide a lesser time of toasting than full depression. By reference to the scale 37, the operator may provide any desired time of toasting.

Figure 6 shows one form of all metal timing element and includes a metal bellows 51 made of thin sheet metal and having its upper portion connected to a slidable member 52 corresponding to the slidable member 29 of Figures 1 to 5. The lower portion of the metal bellows 51 has secured thereto a duct member 53 provided with a duct 54 communicating with the interior of the bellows 51 and with the atmosphere. An adjusting screw 55 is employed to provide for adjustably restricting the effective area of the duct 54 in order to predetermine the rate of travel of the slidable member 52. In toasters in which the heat from the toasting elements tends to damage or age a flexible diaphragm made of fabric, rubber, leather or the like, such as the diaphragm 28 of Figures 1 to 5, the flexible metal bellows of Figure 6 may be employed and combined with the toaster mechanism in a manner similar to that shown in Figures 1 to 5.

The timing element of Figure 7 may also be combined with a toaster structure in a similar manner and has the advantage of providing a greater range of movement of the slidable member 56 which also corresponds to the slidable member 29 of Figures 1 to 5. The device of Figure 7 includes an upper conical shaped flexible metal member 57 having a plurality of annular corrugations of progressively larger diameter and a similar lower flexible member 59. The flexible metal members 57 and 59 have their peripheries secured together in airtight relationship, for example, by soldering or brazing. The lower flexible metal member also has secured thereto a duct member 53 provided with a duct 54 and an adjusting screw 55.

It will be noted that all the modifications of the timing devices of the present invention include air chambers which are completeley closed by flexible members so that it is unnecessary to maintain relatively slidable surfaces in airtight engagement, as would be the case if pistons and cylinders were employed. It is practically impossible to completely shield the timing devices of toasters from the high temperatures and rapid changes in temperature encountered in toaster operation such that distortion and failure of lubrication rapidly renders pneumatic timers having such relatively slidable surface inaccurate, and the same is true of most timing devices such as those employing clockwork. The timing devices of the present invention, particularly those employing metallic flexible members, are not materially affected by changing temperatures and relatively high temperatures such that continued accurate operation is provided.

While we have described a preferred embodiment of our invention, it is understood that the details thereof may be varied in accordance with the scope of the appended claims.

We claim:

1. In a toaster, the combination of: a movable toast carrier, means for urging said carrier toward non-toasting position, means for locking said carrier in toasting position, means for releasing said carrier including a movable member, resilient means for moving said movable member toward releasing position, means for retarding movement of said movable member including a flexible metallic bellows forming a variable volume chamber connected to said movable member, and means for moving said movable member from releasing position to change the volume of said chamber, said chamber having restricted communication with the atmosphere whereby movement of said movable member toward releasing position is retarded.

2. In a toaster, the combination of: a movable toast carrier, means for urging said carrier toward non-toasting position, means for locking said carrier in toasting position, means for releasing said carrier including a movable member, means for moving said movable member toward releasing position, means for retarding movement of said movable member including a pair of conical shaped flexible metallic member having corrugations of progressively larger diameter secured together at their peripheries to form a variable volume chamber, one of said flexible members being connected to said movable member, and means for moving said movable member from releasing position to change the volume of the chamber, said chamber having restricted communication with the atmosphere whereby movement of said movable member toward releasing position is retarded.

PHILLIP S. EDMUNDS.
NED M. BECKER.